2,367,745

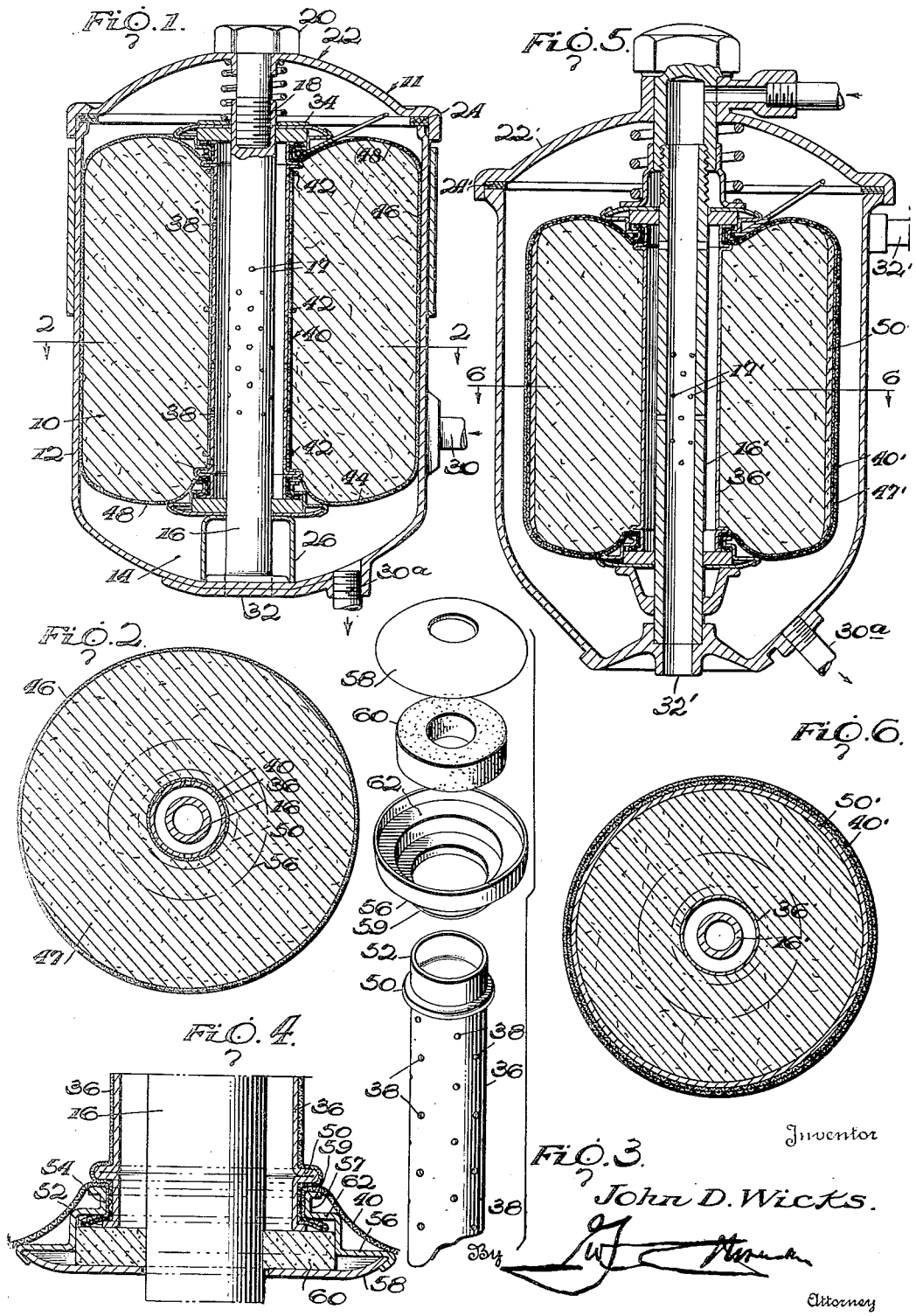
Jan. 23, 1945. J. D. WICKS 2,367,745
FILTER REPLACEMENT UNIT
Filed April 21, 1942
Inventor
John D. Wicks.
Attorney Patented Jan. 23, 1945

UNITED STATES PATENT OFFICE 2,367,745

FILTER REPLACEMENT UNIT

John D. Wicks, Gastonia, N. C., assignor to Accessories Corporation, Gastonia, N. C., a corporation of North Carolina Application April 21, 1942, Serial No. 439,902

6 Claims. (Cl. 210—148)

The improved filter replacement unit comprising the present invention is primarily adapted for use in connection with the lubricating system of internal combustion engines of the automotive type. The invention however is capable of other uses and the same may, with or without modification, be employed in connection with other types of lubricating systems as well as in the filtering of fuel oil and the like.

Specifically, the invention relates to filter replacement units of the cloth bag or "cloth sock" type as distinguished from "metal can" type filter replacement units. Such bag type filters in general consist essentially of a perforated central tube which is surrounded by a cylindrical mass of preferably fibrous vegetable material. The central perforate tube is sealed at opposite ends by means of cork washers or gaskets to prevent short circuiting of oil around the filter media. Oil is admitted to the central tube and is induced to flow through the body of the filtering medium before it can escape from the enclosing casing. Alternatively, the oil is admitted into the interior of the casing at the peripheral regions thereof and is induced to flow inwardly and enter the central perforated tube from whence it may be discharged through one or both ends thereof.

The principal object of the invention is to provide an inexpensive self-contained filter replacement unit of the type set forth above which is effective in removing solids from lubricating oils and to maintain the oil clear and of good color over a period of time and which may be inserted into and removed from its surrounding outer filter casing easily and quickly, thus facilitating replacement of an exhausted unit by a fresh one.

An equally important object of the invention is to provide a cloth bag or sock type cartridge replacement element for oil filters which employs a novel mechanical connection between the cloth sock and upper and lower portions of the perforate center tube of the cartridge which will serve the dual purpose of holding the usual cork washer sealing elements and their retaining devices permanently in position as an inherent part of the filter cartridge and at the same time anchor the cloth sock at opposite ends of the unit to the ends of the central perforate tube. Ordinarily such cork sealing washers accompany each filter replacement unit but remain separate or detached therefrom and upon installing each unit the washers must be properly positioned within the cartridge-enclosing container. Such a procedure is not only time-consuming but presents numerous hazards among which are the danger of breaking the fragile cork washers from improper handling and the danger of failing to remove them each time a new cartridge is installed.

The present invention, among other things, is designed to overcome the above noted limitation that is attendant upon the use of separate sealing washers and toward this end contemplates the provision of a means whereby these washers may be incorporated as an inherent part of the filter cartridge so installation of the washer presents no problem and removal thereof is assured.

It is a further object of the invention to provide a method of forming a sock type cartridge filter which is conducive toward the above mentioned results as well as toward simplicity and economy of manufacture as well as efficiency of operation.

Other objects and advantages of the invention, not at this time enumerated, will become apparent as the nature of the invention is better understood.

In the accompanying drawing forming a part of this specification the invention has been illustrated in two embodiments thereof.

In the drawing:

Fig. 1 is a vertical sectional view taken substantially centrally through a filter cartridge manufactured in accordance with the principles of the present invention.

Fig. 2 is a sectional view taken substantially along the line 2—2 of Fig. 1.

Fig. 3 is an exploded view in perspective showing the manner in which the various parts of the filter unit are assembled.

Fig. 4 is an enlarged sectional fragmentary view taken centrally and axially through the filter unit adjacent one end thereof.

Fig. 5 is a sectional view similar to Fig. 1 showing a modified form of filter cartridge unit, and Fig. 6 is a sectional view taken substantially along the line 6—6 of Fig. 5.

In all of the above described views, like characters of reference are employed to designate like parts throughout.

Referring now to the drawing in detail and in particular to Fig. 1 wherein one embodiment of the invention is shown, the filter replacement unit or cartridge is designated in its entirety at 10 and is shown as being installed within an outer surrounding filter casing assembly 11 including the casing proper 12, the assembly being shown in pale lines. The bottom of the casing 12 is generally rounded to provide an oil sump 14 and supports a hollow central post 16 having perforations 17 therein and the upper end of which is threaded interiorly as at 18 to receive the threaded end of a cap screw 20 by means of which a dome-like cover 22 is securely held in position on the upper open end of the casing 12.

The usual sealing ring or washer is shown at 24 and rests upon the upper rim of the casing and is disposed between the rim and the peripheral rim of the cover 22. An inverted ring-like cup-shaped spacer member 26 surrounds the central post 16 and rests upon the bottom of the casing 12. This spacer member 26 which prevents the original cartridge from going too far down the filter tube also supports the filter replacement unit in proper position. The casing is provided with inlet and outlet ports 30 and 32 respectively.

The filter cartridge unit is centered about the post 16 and is supported at its bottom on the spacer 26. A spring pressed washer 34 bears against the unit at the top thereof and yieldingly holds the latter in position within the casing.

The arrangement of parts of the filter container or case thus far described is more or less conventional in its design and no claim is made herein to any novelty associated therewith. The novelty of the present invention resides rather in the method of forming and the construction of the filter cartridge unit 10 which will now be more fully described and claimed.

The filtering unit 10 includes a central perforate tubular member 36 having both ends open and which is preferably formed of metal. The perforations 38 extend radially through the walls of the tube and are spaced circumferentially and axially around and along the same.

A cloth bag or "sock" 40 surrounds the central tubular member 36 and extends from a point adjacent the top of the latter downwardly along the outer walls of the member and is coextensive therewith. A series of spaced binding wires or straps 42 serve to hold the cloth material in close proximity to the tubular member and to prevent shifting of the material. From the lower regions of the tubular member 36 the cloth material is turned outwardly as at 44 and upwardly as at 46 and again inwardly as at 48 and terminates adjacent the upper regions of the tubular member. The cloth bag or sock encloses a compact fibrous mass of filter material which is preferably of a vegetable nature and one end of the bag is anchored to the lower end of the tubular member 36 in a manner that will appear presently.

The tubular member 36 is formed adjacent its end with a bead 50 wherein the metal of the member is reversed upon itself and compressed. The extreme end of the tubular member 36 is turned outwardly as at 52 and the flange thus formed cooperates with the bead 50 in forming a shallow recess 54 therebetween. A ring-like two-piece washer retaining assembly including an inner cup-shaped member 56 and an outer shallow curved plate 58 surrounds the end of the perforate tubular member 36 and serves to retain therein a ring-like cork sealing washer or gasket 60. The inner member 56 is formed with a horizontal ledge portion 62 upon which the washer or gasket 60 is sealed. The peripheral edge of the inner member 56 is crimped or flanged over the peripheral edge of the outer member 58 and the washer 60 is compressed between the two members. The inner edge portion of the inner member 56 extends in an axial direction to provide a narrow band-like cylindrical portion 57 and the extreme edge thereof is turned outwardly to form an annular flange 59.

The arrangement of structure adjacent the other end of the central perforate member 36 is substantially the same as that just described in connection with the upper end thereof and similar characters of reference have been applied to the corresponding parts in Fig. 4 to avoid repetition of description. At the lower end of the perforate tubular member, however, the intermediate portion of the cloth sock 40 is received behind the cylindrical band-like portion 57 of the member 56 and is firmly gripped between the bead 50 and the adjacent out-turned rim 59.

It will be seen that the upper binding wire or strap 42 serves to hold the cloth sock 40 in close proximity to the tubular member 36 immediately beneath the bead 50 but it is entirely within the scope of the present invention to surround the perforate member coextensively with a separate cloth jacket and to anchor the edge of the cloth sock 40 at both ends within the upper groove or recess 54 if desired. Irrespective of these details in construction, the essential features of the invention are at all times preserved.

In the manufacture of the replacement unit the beads 50 are first formed in the perforate member 36 and the central portion of the cloth sock 40 is slipped onto the perforate tube and fitted coextensively therealong and the binding wires 42 are applied. Thereafter a predetermined amount of the fibrous filter material 47 is inserted between the central portion of the cloth sock and the inner surface of a cylindrical mold (not shown) and thereafter the cloth sock is gathered or pulled around the fibrous material and its extreme edge portion is brought into close proximity with the end of the perforate member 36. The lower cup-shaped member 56 is positioned over the end of the perforate member with the end of the cloth sock inside the same. Thereafter the radial flange 59 is formed by a suitable flanging operation and the end of the cloth sock is thus securely held in position. The cork washer or gasket 60 is inserted within the member 56 and the cover or cap 58 is placed thereover. The outer rim of the member 56 is then crimped or flanged over the edge of the cover 58 to complete the lower end assembly.

The upper end assembly is formed in substantially the same manner as the lower end assembly with the exception that the cloth sock 40 does not have to be reckoned with unless the central portion thereof is formed as a separate piece. In actual practice either end assembly may be first formed without interfering with subsequent operations.

If desired, a loop of wire may be placed around the lower end of the upper member 56 and extended outwardly between the upper surface of the cloth sock 40 and the lower surface of the member 56 to facilitate removal of the entire replacement unit from its surrounding filter casing 10.

The form of the invention just described and shown in Fig. 1 is suitable for use where the flow of oil takes place inwardly through the fibrous material. Purified oil which passes inwardly through the perforations 17 in the hollow post 16 may be discharged through the port 32.

The form of the invention shown in Fig. 5 is quite similar in its construction to the form of the invention shown in Fig. 1 and a detailed description of this latter form of filter is thought to be unnecessary. Similar reference characters have been applied to the corresponding parts in the drawing to avoid repetition of description. The form of the invention shown in Fig. 5 is designed for centrifugal outward flow of oil from within the central post 16' through the perforations 17' and outwardly through the perforations in the central tube 36' and through the filter material 47'. In this form of the invention the cloth sock 40' is of double thickness and is not fitted coextensively along the outer surface of the central tubular member 36' and both ends of the sock are anchored in the end washer assemblies in the form of the invention illustrated in Fig. 5 of the drawing. These assemblies are the same as those illustrated in Fig. 1 with the exception that the shallow curved outer plates may be omitted and the cork or other washers exposed to and cooperate with the adjacent parts of the filter. In this form of the invention the inlet is at the center of the bottom and the outlet 32' is located at one side of the casing near where the cover abuts the side wall filter casing.

In each form of the invention a drain 30ª is provided at the bottom sump portion of the casing and in practice is controlled by a suitable valve (not shown).

While in the accompanying drawing two arrangements of the sock are illustrated it will be clear that the sock may be arranged in any other desired manner and with the form of the invention illustrated in Fig. 1 both ends of the sock may be secured at the lower region of the perforate tube instead of at the upper portion of the tube as illustrated in Figure 1.

A cylindrical filter sheet 50' is positioned just inside of the outer wall of the cloth sock for final filtering of the small foreign particles prior to release and subsequent discharge of the oil from the filter casing through the outlet port 32.

The invention is not to be limited to the exact arrangement of parts shown in the accompanying drawing or described in this specification as various changes in the details of construction may be resorted to without departing from the spirit of the invention. For example, while in Fig. 1 there is shown a filter sock or bag of single thickness material and in Fig. 2 there is shown a cloth sock of double thickness material, it is obvious that single or double thickness material may be employed in either instance. Also while the central perforate tube 36 or 36' is flanged interiorly of the washer retaining assembly, the connection to this assembly may be made by a spot welding operation with the tube fitting exteriorly over the inner end of the cup-shaped washer retaining member 56 or 56'. The specific location of the inlet and outlet ports with respect to the outer filter casing is immaterial and in fact the invention is not concerned with the type of casing employed. Only insofar as the invention has particularly been pointed out in the accompanying claims is the same to be limited.

What is claimed is:

1. The method of anchoring a portion of a tubular cloth filter sock and the inner edge of a washer retaining ring to a perforate center tube in a filter replacement unit which comprises forming an outwardly extending annular bead in the wall of said tube at a region spaced inwardly from an end thereof, positioning a portion of the filter sock against the tube on the side of said bead adjacent said end, positioning said washer retaining ring over said sock portion and tube, and flanging the end of said tube over the cloth material of the sock and the inner edge of the washer retaining ring under pressure and causing the ring to press the sock against said bead.

2. In a filter replacement unit, a perforate central tube having open ends, a bead formed in the wall of said tube and spaced inwardly from an end thereof and extending radially outwardly of the tube, said end of the tube being turned outwardly to provide an annular radial flange spaced from said bead forming in conjunction with the latter an annular recess extending around the tube, a filter sock formed of fabric material and having a tubular formation and enclosing filter material therein, one free edge of said sock being disposed in said recess, a washer, a washer retaining ring-like member surrounding said free edge and having said washer disposed therein, means for holding said washer in the retaining member, and the said flange serving to clamp the said member and the free edge to hold the end of the sock in place.

3. The combination with a perforate center tube for replacement filter cloth sock cartridges for containing a filter material; a shallow cup-shaped ring-like washer retaining member having its inner edge secured to said tube adjacent one end thereof and having a flange at its outer edge, a washer disposed within said cup-shaped retaining member, and a cover plate of ring-like form closing and connected with said cup-shaped retaining member by said flange and serving to conceal and protect said washer.

4. The combination with a perforate center tube for replacement filter cloth sock cartridges for containing a filter material; a shallow cup-shaped ring-like washer retaining member having its inner edge secured to said tube adjacent one end thereof, a washer disposed within said cup-shaped retaining member, and a cover plate of ring-like form closing said cup-shaped retaining member and serving to conceal and protect said washer, the outer peripheral edge of said cup-shaped retaining member being flanged over the outer peripheral edge of said cover plate and serving to draw the latter against said washer to retain the same permanently in position within the cup-shaped member.

5. The method of anchoring a portion of a tubular cloth filter sock to a center tube in a filter replacement unit which consists in providing means extending radially outwardly from the wall of said tube at a region spaced inwardly from an end thereof, positioning a portion of the filter sock over said radially outwardly projecting means and against the tube adjacent the end thereof, positioning a sock retaining means in the form of a ring over said sock portion and the end of the tube, and deforming the end of said tube, thereby causing the ring to press the sock against the tube and the said radially outwardly extending means and thus firmly and fixedly secure the end of the sock in place.

6. In a filter replacement unit, a center tube having open ends, a cloth filter sock, said filter sock being spaced from the center tube and containing filter material in said space and having portions of the sock engaging opposite ends of the tube, and a ring-like clamping means having a recess therein and surrounding that portion of the sock material adjacent each end of the tube, a washer, said washer being disposed in the said recess in the clamping means, and the said tube being deformed at each end to engage the sock material and causing the said sock material to be firmly pressed against the tube, and means to retain the washer in the said recess in the clamping means.

JOHN D. WICKS.